April 12, 1949.  J. F. MASON  2,467,061

SEALING DEVICE FOR HIGH-PRESSURE VESSELS

Filed Jan. 24, 1946

*INVENTOR.*
JOHN F. MASON
BY Earl Babcock

Patented Apr. 12, 1949

2,467,061

UNITED STATES PATENT OFFICE 2,467,061

SEALING DEVICE FOR HIGH-PRESSURE VESSELS

John F. Mason, Duncan, Okla., assignor to Halliburton Oil Well Cementing Company, Duncan, Okla.

Application January 24, 1946, Serial No. 643,108

2 Claims. (Cl. 220—46)

This invention relates to sealing devices adapted for use in high pressure vessels and more particularly to gaskets suitable for use in valve pots of high pressure pumps such as used in the oil industry.

Pumps used in servicing oil wells are required to circulate or force heavy materials, such as mud and cement, under high pressure for considerable lengths of time. In order to pump these heavy materials it is necessary that the covers on the valve pots be sealed against pressure and suction. Pressures as high as 10,000 pounds per square inch are encountered. Not only must the covers on the valve pots be sealed to withstand these high pressures, but they must also be easily removable so as to make the valves readily accessible.

Heretofore, in attempting to solve this problem, a flat fiber gasket has been inserted between the cover and the valve pot. However, this has not been entirely satisfactory. Even though tightly clamped, the gasket distorts under high pressure. When this distortion takes place fluid will leak past the gasket. It has been proposed to use V-type or chevron packing, but this type is not very satisfactory for holding against suction, and if air is allowed to bypass during the suction stroke of the pump, the pump's efficiency will be greatly reduced. Moreover, V-type packing is not easily installed in unexposed areas such as valve pots, and unless properly installed does not function properly.

In accordance with the present invention, it is proposed to provide rubber gaskets for use in sealing the valve covers of high pressure oil field pumps and which are capable of sealing against both suction and pressure. To accomplish this, and still avoid tight clamping, a rubber ring is provided with a depending grooved flange, the lips of which, due to special construction of the ring, are caused to be pressed against cylindrical surfaces of the valve pot and cover so that the seal against the high pressure is effected by these lips rather than by the ring itself.

It is an object of the invention to provide a gasket capable of withstanding extremely high pressures and still be easily assembled with the parts to be sealed.

It is another object of this invention to provide a gasket which does not require tight clamping to form a seal but which prevents leakage at all times after installation, even though yielding sufficiently to permit equalization of tension on stud bolts or other means used to hold the parts to be sealed together.

It is still another object of the invention to provide a novel valve pot cover and gasket assembly which is so arranged that when the cover is placed in position on the pot, even though only loosely held, the gasket is deformed in such a way as to insure an adequate seal against high internal pressure in the pot.

Other objects and advantages reside in certain novel features of the construction of the gasket and assembly, as will be apparent from the following description taken in connection with the accompanying drawing, in which.

Figure 1:
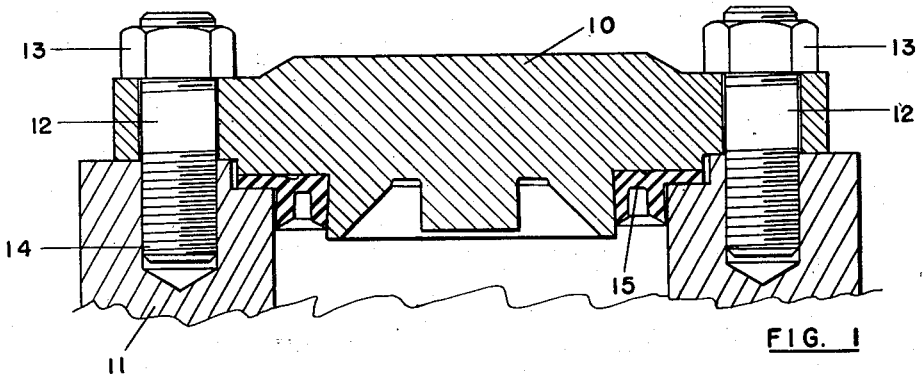
Fig. 1 is a view of a portion of a valve pot and cover with a gasket constructed in accordance with the invention forming a seal therebetween.
Figure 3:
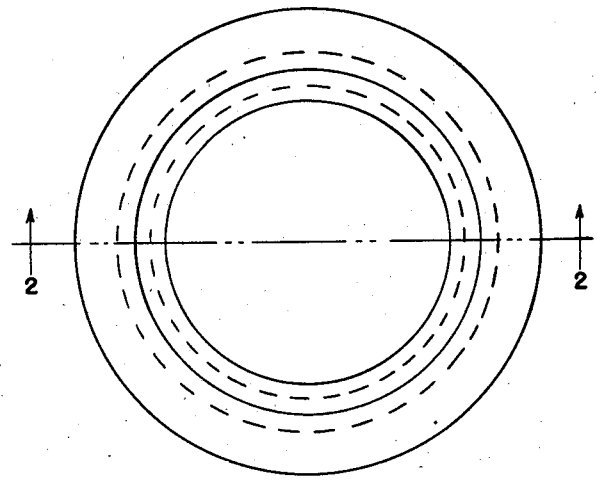
Fig. 3 is a top view of the rubber gasket of Fig. 1.
Figure 2:
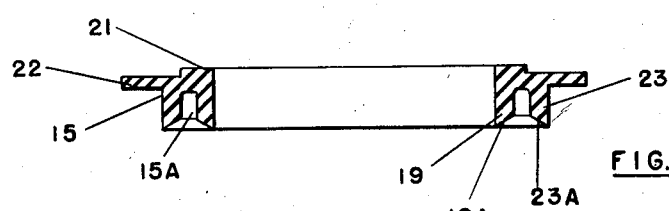
Fig. 2 is a cross-sectional view of the rubber gasket shown in Fig. 1.

Referring to the drawing in detail and particularly to Fig. 1, it will be seen that a valve cover is shown at 10. This is clamped to a valve pot or housing 11 by stud bolts 12 and nuts 13. The stud bolts are secured to the housing 11 by threads 14. Clamped between the valve cover 10 and the pot 11 is a gasket 15. This gasket can be made of molded rubber, neoprene or other suitable elastic substance. As shown in Figures 2 and 3, the gasket consists of a flat ring portion 22 having a depending flange 15 of smaller outside diameter than the outside diameter of the ring portion 22, so that the flange 15 may be mounted by the ring portion 22 in the annular space between the inner cylindrical surface 20 of the valve pot and the outer cylindrical surface 18 on a flange 18A provided on the valve cover.

The depending flange 15 of the gasket is provided with a deep groove 15A on its lower edge so as to provide two lips 19 and 23 engaging the surfaces 20 and 18, respectively. Adjacent the groove 15A, the lips 19 and 23 are beveled as shown at 19A and 23A, so that the lower edges of the lips are tapered toward the surfaces 20 and 18.

The flange 15 of the gasket must be of such dimensions as to be easily mounted and removed. At the same time it is essential that the lips 19 and 23 engage the surfaces 20 and 18, if they are to maintain proper sealing action. To provide both of these features, the outer diameter of the flange 15 is made less than that of the internal diameter of the valve pot to provide adequate clearance, but the ring portion 22 itself is provided with a raised portion or boss 21. The diameter of this boss is somewhat less than the outside diameter of the depending flange 15, as shown in Fig. 2, and because of it, certain forces are set up within the gasket when the cover 10 is assembled with it and the valve pot which cause the lips 19 and 23 to fit tightly against the surfaces 20 and 18 and thus obtain proper sealing action.

Figure 4:
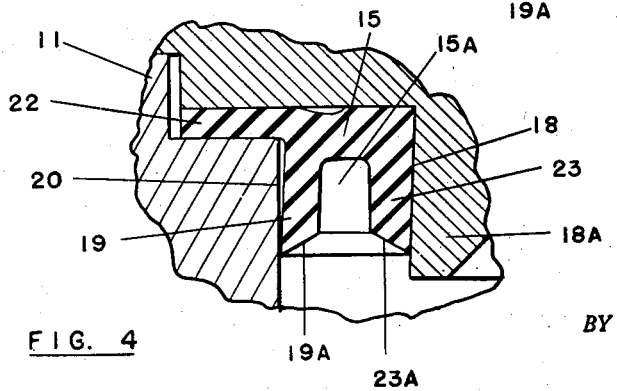
Fig. 4 is an enlarged fragmentary cross-sectional view showing the new gasket clamped in position and illustrating its deformation under the action of the cover thereon.

Portions of the gasket are deformed, as shown somewhat exaggerated in Fig. 4, when the parts are assembled. The boss 21 being pressed downwardly by the cover tends to spread the lower portions of the lips 19 and 23 or, in other words, the action sets up forces which tend to make the internal diameter of the flange 15 smaller and the outer diameter larger than normal. These forces need not be large in order to promote the proper sealing action, because once the lower edges of the lips 19 and 23 engage the cylindrical surfaces 20 and 18, the fluid pressure tends further to effect a seal, but unless some spreading action of the flanges is brought about, leakage occurs.

The surface 18 of valve cover 10 may be slightly conical or tapered out at the bottom instead of being truly cylindrical so as to tend to hold gasket 15 in position once it is mounted on the valve cover and the gasket may fit tightly on the flange 18A of the cover, but the lip 19 must fit loosely inside surface 20 if the parts are to be easily assembled. By providing means for forcing the lip 19 outwardly into contact with the inner surface of the valve pot, the gasket is easy to install and remove. At the same time, proper sealing is insured. The action is such that the higher the pressure applied, the tighter the lips of the gasket seat. When the pump is on the suction stroke, the ring portion 22, which is held tightly between surfaces 16 and 17, allows no leak into the valve chamber. On the compression stroke of the pump, the high fluid pressure in the pot is exerted against the lips 19 and 23 and does not tend to cause leakage past the flat ring portion 22 of the gasket.

When the pressure is released, the valve cover 10 can be easily removed. It is not necessary to have the nuts 13 on the stud bolts 12 screwed down tightly in order to withstand the high pressures encountered inside the valve pot. In fact, an advantage is obtained if the nuts are not screwed down tightly, for then the whole cover 10 may be said to be cushion-mounted on the ring portion 22 and the forces due to fluid pressure which tend to lift the same are equalized or evenly distributed over the stud bolts. Experience has shown that the use of the present invention minimizes the danger of all the pressure being localized on only a few of the retaining stud bolts 12.

While only one embodiment of the invention has been shown and described herein, it is obvious that many changes may be made without departing from the spirit of the invention or the scope of the annexed claims.

I claim:

1. In combination, a valve pot of a high pressure pump, the pot having a cylindrical surface on the interior thereof, a cover for the pot having a cylindrical surface extending into the pot, and a gasket of elastic material for maintaining a seal between the pot and the cover, said gasket having a flat ring portion adapted to be clamped between the pot and the cover to hold the gasket in place, and a depending flange mounted between the inner cylindrical surface of the pot and the cylindrical surface of the cover, said flange having a deep groove on its lower edge to provide lips engaging the cylindrical surfaces, and the flat ring portion of the gasket having a boss on its upper surface of lesser diameter than the outer diameter of the depending flange and adapted to be depressed by the cover when the cover is in place on the pot to set up forces in the gasket tending to spread the lips of the depending flange thereby insuring sealing action between the lips and the cylindrical surfaces.

2. In combination, a valve pot of a high pressure pump, the pot having a cylindrical surface on the interior thereof, a cover for the pot having a cylindrical surface extending into the pot, a plurality of bolts for securing the cover to the pot, and a gasket of elastic material for maintaining a seal between the pot and the cover, said gasket having a flat ring portion adapted to be clamped between the pot and the cover by said bolts to hold the gasket in place, and a depending flange mounted between the inner cylindrical surface of the pot and the cylindrical surface of the cover, said flange having a deep groove on its lower edge to provide lips engaging the cylindrical surfaces, and the flat ring portion of the gasket having a boss on its upper surface of lesser diameter than the outer diameter of the depending flange to deform the gasket and create, when the cover is secured in position by the bolts, forces in the gasket tending to spread the lips of the depending flange, thereby insuring sealing action between the lips and the cylindrical surfaces.

JOHN F. MASON.

REFERENCES CITED

The following references are of record in the file of this patent:

UNITED STATES PATENTS

| Number | Name | Date |
|---|---|---|
| 443,952 | Baguley | Dec. 30, 1890 |
| 786,697 | Wackenhuth | Apr. 4, 1905 |
| 1,389,542 | Wereley | Aug. 30, 1921 |
| 1,566,983 | Sheriff | Dec. 22, 1925 |
| 1,949,055 | Lambie | Feb. 27, 1934 |